Figure 1:
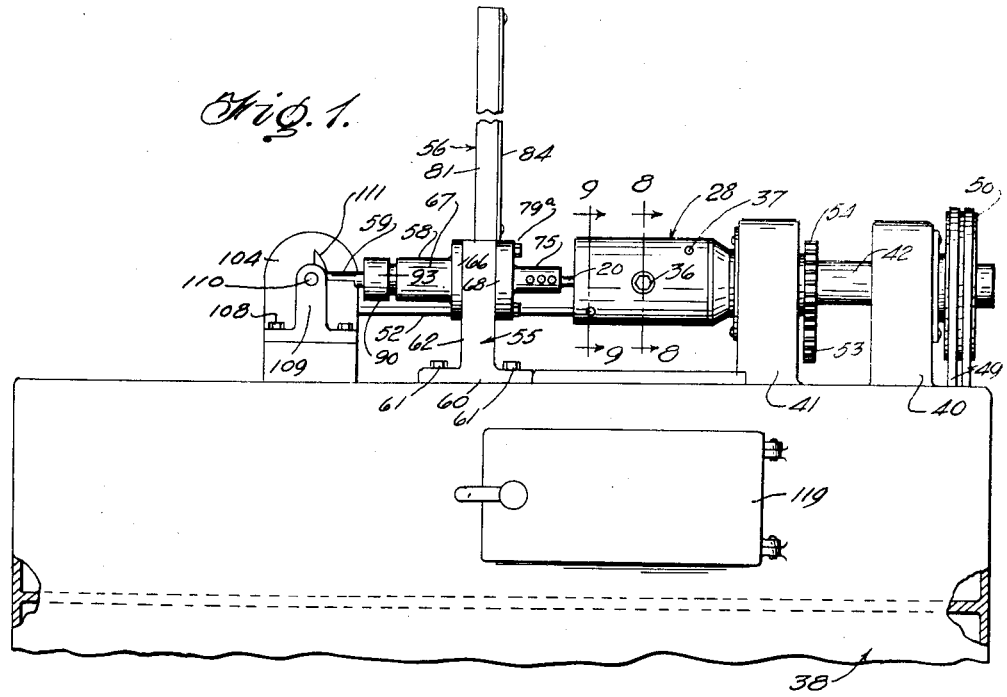

May 23, 1939.  H. E. PRUITT  2,159,708
SINGLE SPINDLE NUT TAPPING MACHINE
Filed March 9, 1938  3 Sheets-Sheet 1

Inventor
HARVEY E. PRUITT,
By Kimmel & Crowell
Attorneys.

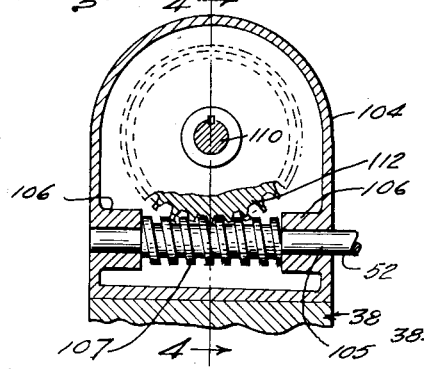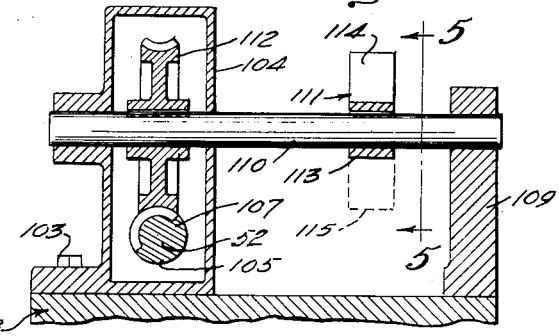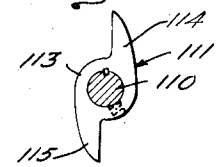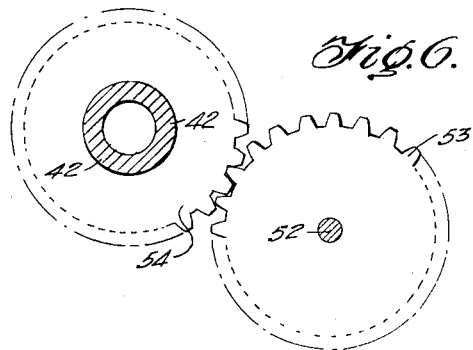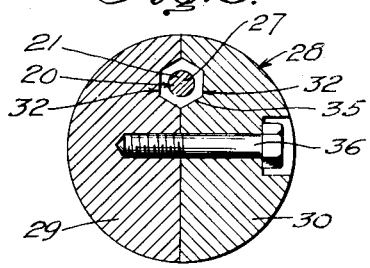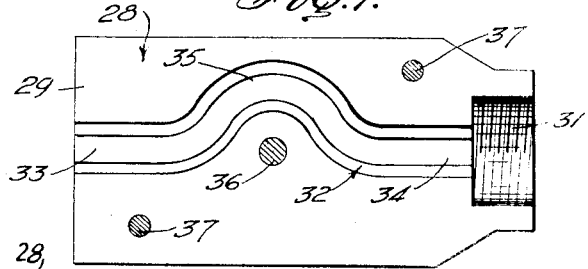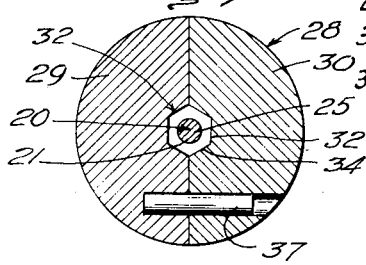

May 23, 1939.  H E PRUITT  2,159,708
SINGLE SPINDLE NUT TAPPING MACHINE
Filed March 9, 1938  3 Sheets-Sheet 3
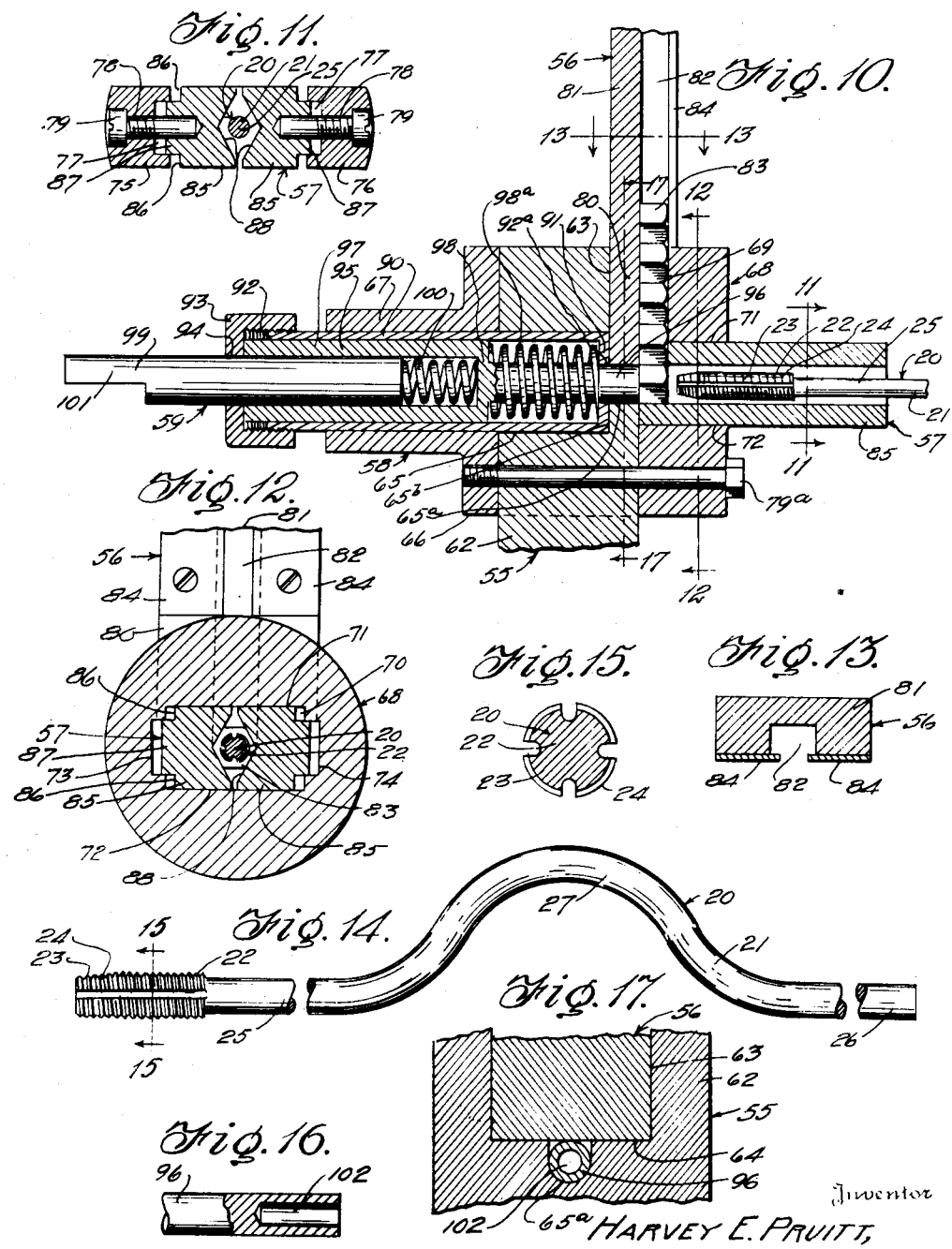
Inventor
HARVEY E. PRUITT,
By Kimmel & Crowell,
Attorneys.

Patented May 23, 1939

2,159,708

UNITED STATES PATENT OFFICE 2,159,708

SINGLE SPINDLE NUT TAPPING MACHINE

Harvey E. Pruitt, Flint, Mich., assignor to Palmer-Edwards Company, Flint, Mich., a corporation of Michigan Application March 9, 1938, Serial No. 194,947

14 Claims. (Cl. 10—139)

This invention relates to a nut tapping machine and has for its object to provide, in a manner as hereinafter set forth, a machine of the class referred to so constructed and arranged to permit it to be used for expeditiously tapping right hand or left hand nuts.

The invention has for its further object to provide, in a manner as hereinafter set forth with a tap so arranged and so formed whereby during its operation it is centered with respect to the work to be acted upon by the work which it has completed.

The invention has for its further object to provide, in a manner as hereinafter set forth, a machine of the class referred to including a driving head for the tap and with the latter being so related to the head whereby the work completed by the tap couples the latter to the head to provide for a uniform and centered operation of the tap with respect to the work to be acted upon.

A further object of the invention is to provide, in a manner as hereinafter set forth a nut tapping machine including a tap, a driving head therefor and a driving spindle for the head, and with said tap, head and spindle being so formed and so related to provide for the expeditious discharge of the completed work from the machine, and with the completed work concealed until it arrives at the point of discharge therefor from the machine.

Further objects of the invention are to provide, in a manner as hereinafter set forth, a machine for the purpose referred to which is simple in its construction and arrangement, strong, durable, compact, readily assembled, capable of being conveniently converted into a left hand tapping action from a right hand tapping action or vice versa, when desired, thoroughly efficient in its use, readily assembled, expeditiously repaired when occasion requires, and comparatively inexpensive to manufacture.

Embodying the aforesaid objects and to others which may hereinafter appear, the invention consists of the novel construction, combination and arrangement of parts as will be more specifically described and illustrated in the accompanying drawings, wherein is shown an embodiment of the invention, but it is to be understood that changes, variations and modifications may be resorted to which fall within the scope of the invention as claimed.

Figure 2:
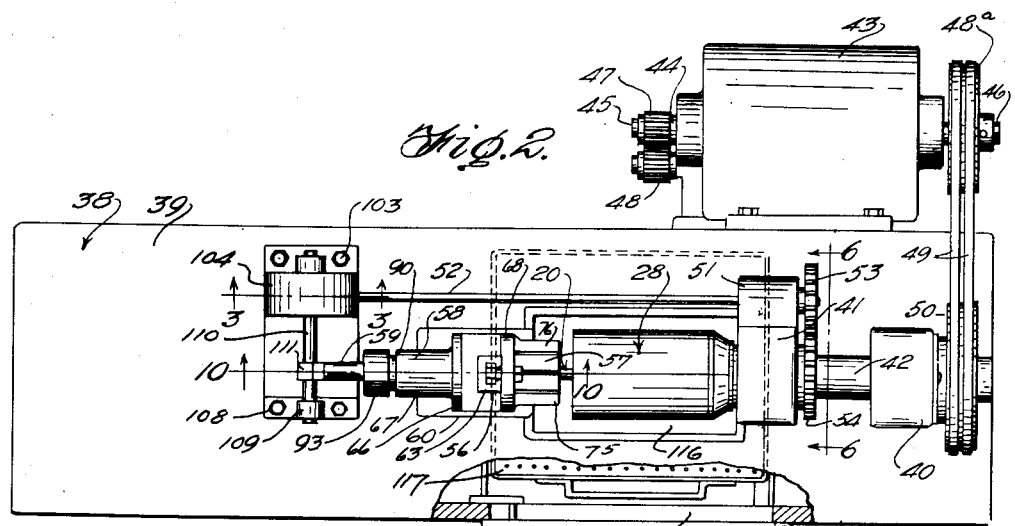
Figure 11A:
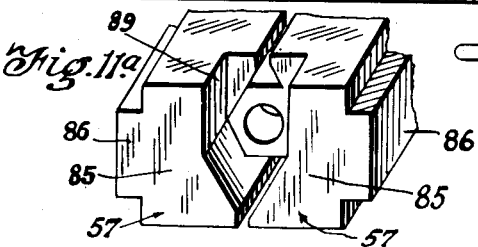

In the drawings:

Figure 1 is a side elevation of the machine with certain parts broken away and others shown in section, the better to disclose the construction, Figure 2 is a plan view of the machine with certain parts broken away and others shown in section, Figure 3 is an enlarged fragmentary section on the line 3—3 of Figure 2, Figure 4 is a section on the line 4—4 of Figure 3, Figure 5 is a fragmentary section on the line 5—5 of Figure 4, Figure 6 is an enlarged fragmentary section on the line 6—6 of Figure 2, Figure 7 is an inside face view in elevation of one of the sections of the driving head for the nut tapper element, Figure 7a is a sectional detail illustrating the spindle, Figure 8 is a section on the line 8—8 of Figure 1, Figure 9 is a view similar to Figure 8 but taken on the line 9—9 of Figure 1, Figure 10 is an enlarged fragmentary section on the line 10—10 of Figure 2, Figure 11 is a section on the line 11—11 of Figure 10, Figure 11a is a fragmentary view in perspective looking towards the inner end of the blank holders, Figure 12 is a section on the line 12—12 of Figure 10, Figure 13 is a section on the line 13—13 of Figure 10, Figure 14 is a side elevation of the nut tapper element, Figure 15 is a section on the line 15—15 of Figure 14, Figure 16 is a detail partly in elevation and partly in section of the inner terminal portion of the blank or work pusher plunger, and Figure 17 is a fragmentary section on the line 17—17, Figure 10.

The machine is to include a pair of nut tapping tools, one for tapping right hand and the other for tapping left hand nuts, the tool for tapping right hand nuts, when used, is to revolve clockwise. The tool for tapping left hand nuts, when used, is to revolve anticlockwise. Each tool is of like form and consists of a shank and a tap. The latter is of greater diameter than and is formed integral at its inner end with and disposed concentric to the inner end of the shank. The tap is formed with spaced peripheral flutes from end to end thereof. The flutes of one tap are formed throughout with right hand threads and the flutes of the other tap are formed throughout with left hand threads. The entrance end of each tap is tapered. The tool as shown will be of the cranked type having its end terminal portions co-axial. A driving head is common to either tool and is selectably revolved in clockwise and anti-clockwise direction depending upon which of the tools it is driving. But one tapping tool is shown and it is of the form employed for tapping right hand nuts. The tapping tool shown is indicated generally at 20. The shank and tap of tool 20 are designated 21, 22 respectively. The flutes on tap 22 are indicated at 23 and the threads on the flutes at 24. The shank 21 consists of a bar of materially greater length than the tap. The bar is of cylindrical cross section and consists of a pair of endwise aligned spaced horizontal end portions 25, 26 and an intermediate bow-shaped portion 27 of less length than and which merges into the inner ends of the portions 25, 26. The tap 22 is integral at its inner end with the outer end of end portion 25. The tool 20 is of greater length than the head for driving it.

The driving head for the tapping tool indicated at 28 is formed of a pair of complemental oppositely disposed sections 29, 30 of segmental contour in vertical cross section. Each head section has its inner face, at one end thereof, formed with a horizontally disposed short semi-circular threaded groove 31, closed at its inner end and opening at its outer end at the outer end of the section. Each head section has its inner face provided lengthwise thereof with a groove 32 which extends from the inner end wall of groove 31 to the inner end of the section. The groove 32 opens into the groove 31 and is formed with a pair of horizontally disposed inner endwise aligned outer end portions 33, 34 and an intermediate bow-shaped portion 35 which merges at its ends into the inner ends of the portions 33, 34. The groove 32 in cross section is of angle-shaped contour. The sections 29, 30 are detachably secured together in abutting relation by the countersunk connection and holding means 36, 37 respectively. When the heads are connected together in abutting relation, the grooves 31 of said sections coact to form an annular threaded socket and the grooves 32 of said sections coact to provide a passage which leads from the inner end of head 28 and opens into the socket formed by the grooves 31. This passage is for receiving the major portion of the shank of the tapper tool for connecting the latter to the head. The cross sectional contour of the passage conforms to the contour of the completed work. The latter is conducted off from the machine through the said passage. When the work is completed it is mounted and travels outwardly on the tapper tool and also is guided by the latter through the passage. The completed work as it travels on the tool and in connection with the walls of the passage couples the tool to the head in a manner whereby the tap will be centered with respect to the work to be acted upon and acts on the work in a uniform manner. The lengthwise contour of the passage conforms to the lengthwise contour to the shank of the tool. The bow-shaped intermediate portion of the passage coacts with the bow-shaped intermediate portion of the tool shank to prevent the tool moving lengthwise in either direction with respect to the head during the operation of the tool.

The machine includes a hollow supporting structure 38 having its top providing a platform or table 39 upon which are secured upstanding spaced aligned bearings 40, 41 for a hollow driving spindle 42. The latter extends outwardly from bearing 40 and inwardly from bearing 41. The inner end of spindle 42 is peripherally threaded, extends into the socket formed by the coaction of the grooves 31 in head 28 and threadedly engages with the wall of the socket for securing head 28 thereto whereby the latter and spindle will rotate in unison. The spindle is to abut the inner wall of the socket. The passage through which the completed work is conducted off opens into the inner end of the spindle. The completed work is discharged at the outer end of the spindle.

Anchored to one side of the supporting structure 38 is a reversible electric motor 43 constituting the prime mover for operating the machine. The motor shaft 44 is extended at each end with respect to the body of motor 43, as at 45, 46. The extended end 45 of shaft 44 is provided with a pinion 47 for operating a transmission 48 employed in driving an oil pump not shown. The extended end 46 of shaft 44 has secured thereon a double grooved pulley 48ª employed for driving a pair of endless transmission belts 49 which are connected to and drive a double grooved pulley 50 secured to the spindle 42. The pulley 50 constitutes a drive for the spindle 42. As motor 43 is reversible, the spindle 42 may be selectively rotated in a clockwise and anti-clockwise direction.

Secured to and extended laterally from the outer side of bearing 41 is a bearing 51 for a transmission shaft 52 extended from the front and rear of said bearing 51. The front end of shaft 52 is provided with a gear wheel 53 which meshes with and is driven from a gear wheel 54 carried by spindle 42 between the bearings 40, 41. The arrangement is such that shaft 52 is operated simultaneously with and in an opposite direction of rotation with respect to the rotation of the spindle 42.

Secured upon the platform 39 rearwardly and in spaced relation to the head 28 is a supporting structure 55 common to a chute or tube 56 for conducting the work to be acted upon, adjustable holders or holding jaws 57 for the blanks or the work to be acted upon and a combined retainer and guide 58 for a horizontally disposed spring controlled pusher structure 59. The work to be acted upon will be hereinafter referred to as a blank.

The structure 55 includes a horizontal bar or foot piece 60 anchored to the platform 39 by the holdfast means 61. Formed integral with the bar 60, between the holdfast means 61 is the lower end of a standard 62. The upper portion of the standard 62 is formed with a cut-out 63 opening centrally of its front and also opening at its top. The base of the cut-out is designated 64. The upper portion of the standard 62 is provided with a horizontally disposed socket 65 having a part thereof arranged below the base 64 of the cut-out 63. The upper portion of standard 62 is formed with a groove 65ª opening at the front of the standard, at the base 64 of the cut-out 63, and into the socket 65 axially of its base end 65ᵇ. A part of the latter opens into the cut-out 63. The socket 65 opens at the rear face of standard 62. Secured to the rear face of the upper portion of the standard 62, is the annular flange 66 of a rearwardly extending sleeve 67. The inner diameter of the sleeve 67 corresponds to the diameter of the socket 65. Positioned against the front of the upper portion of the standard 62 is a circular disc-like body 68 having its rear face formed with a vertical cut-out 69 which is oppositely disposed with respect to and coacts with the cut-out 63 to provide a socket for receiving the lower end portion of the feed chute or tube 56. The body 68 centrally thereof is formed with a diametrically extending horizontally disposed opening 70 of substantially rectangular contour in which the lower end of the cut-out 69 opens through the top wall of such opening. The top wall of opening 70 is indicated at 71, its bottom wall at 72 and its side walls at 73, 74. The intermediate portion of each side wall is offset with respect to the upper and lower portions thereof. The body 68 includes a pair of oppositely disposed forwardly extending, spaced, parallel supporting arms 75, 76 provided on their inner faces with grooves 77 forming flush continuations of the intermediate portions of the side walls 73, 74. The non-grooved parts of the inner faces of the arms 75, 76 form flush continuations of the upper and lower portions of the side walls 73, 74 of the opening 70. The arms 75, 76 are formed with aligned sets of spaced, countersunk, screw threaded, transversely disposed openings 78 which communicate with the grooves 77. Threadedly engaging in each of the openings 78 and extending inwardly therefrom, as well as through groove 77, is a countersunk, combined supporting adjusting and limit screw 79 for a blank holding jaw 57. The standard 62, sleeve 67 and body 68 are detachably secured in abutting relation by the holdfast means 79a passing through body 68, standard 62 and having threaded engagement with the flange 66 of sleeve 67.

Mounted in the socket formed by the coaction of the cut-outs 63, 69 is the lower portion 80 of the feed chute 56. A part of the lower end of the chute 80 seats on the base 64 of the cut-out 63. The latter is arranged below the top wall 71 of the opening 70. The chute 56 consists of a bar 81 of the desired length and of rectangular cross section. The front face of bar 81 is formed centrally and from end to end thereof with a guide groove 82 for the blanks 83 which are arranged in superimposed relation and fed to the holders 57 by gravity. That portion of bar 81 which extends upwardly from the top of standard 62 and body 68 has secured to its front face a pair of thin spaced retainer strips 84 for the blanks 83. The strips partly extend across the mouth of groove 82 to retain the blanks 83 in the chute 56 during the feeding of the blanks. The lower end of strips 84 are seated on the top of body 68.

The blank holders 57 are of like form and oppositely disposed. Each holder is in the form of a block 85 of greater length than an arm 75 or 76. The outer side face of the block 85, at the top and bottom of such face is rabbeted lengthwise, as at 86 to form such face with a lateral extension 87 which is slidably mounted in a groove 77. The inner side face of the block is formed lengthwise thereof with a groove 88 of angle-shaped contour in vertical section. The contour of a groove 88 is to conform to the contour of either side of a blank. The grooves 88 of the blocks 85 coact to not only slidably support a blank, but also to guide the latter when it is being operated upon by the tapper tool. The rear end of each of the blocks 85, at the upper portion thereof is cutaway, as at 89 to provide for the lower end of the chute 56 opening into the blocks 85 at their rear and for the passage of a blank into the oppositely disposed grooves 88 to be positioned in the path of the pusher structure 59.

Each arm 76 has its outer side formed with a set of spaced sockets 89, each for receiving a combined supporting adjusting and limit screw 79. The blocks 85 are slidably mounted on the screws and their outward shift, due to the lateral pressure of the blanks when these latter are being acted upon is limited by the screws 79. The blocks 85 may be adjusted towards each other by the screws 79.

The pusher or blank shifting structure 59 is spring controlled, of the plunger type and its function is to push, shove or force a blank in a direction towards and to be engaged by the tap. When the machine is set up for operation, the tap is permanently positioned in and in concentric spaced relation with respect to the walls of the grooves 88. The structure 58 includes a horizontally disposed annular socket forming member 90 closed at its forward end, as at 91 and open at its rear end 92. The end 91 is provided with an axial opening 92a. The member 90 is arranged in socket 65 and sleeve 67. The end 91 abuts the standard 62. The member 90 extends rearwardly from sleeve 67 and has threadedly engaging with its rear end 92, a cap 93 formed with an axial opening 94. Positioned in the member 90 is a primary plunger element 95 formed of a substantially solid forward part 96 of circular cross section and a hollow rear part 97 closed at its forward end and open at its rear end. The part 97 is of annular cross section. The part 96 is of materially less diameter than and is disposed centrally of the closed end 98 of part 97. The part 96 operates through the opening 92a and the groove 65. Surrounding the part 96 and interposed between the end 91 of member 90 and the end 98 of part 97 is a coiled combined cushioning and controlling spring 98a for the element 95. The spring 98a also constitutes an elastic abutment for the plunger element 95 on the inner direction of movement of the latter and also functions to impart the outer direction of movement of such plunger element. The part 97 of element 95 slides against the inner face of member 90. Extending through the opening 94 of cap 93 and into the part 97 of element 95 is a solid secondary plunger element 99 constituting a shifter for element 95. Arranged within the part 97 of element 95 and interposed between the forward end of element 99 and the end 98 of part 97 is a coiled combined cushioning and controlling spring 100 for element 99. The spring 100 also constitutes an elastic abutment for the plunger element 99 on the inner direction of movement of the latter and also functions to impart the outer direction of movement to such plunger element. The lower face of the latter, at its outer end portion is rabbeted to form element 99 with a reduced rear end terminal portion 101 of segmental cross section. Intermittent impulses, by a means to be referred to are given to the element 99, against its controlling spring for the purpose of intermittently shifting element 99 in a direction towards the element 98 and which in turn will intermittently shift the element 95, against the action of its controlling spring in a direction towards the tap. The action of element 95, when it is shifted towards the tap will provide for successively pushing or forcing the blanks onto and to be engaged by the tap. The forcing of the successive blanks onto the tap will cause the latter to thread or tap the blanks. As the blanks are being tapped, a follower blank provides for a leading blank to travel lengthwise of the tap to an extent to pass onto the shank and from the shank into the spindle 42 for discharge. After the part 96 of element 95 has forced or pushed a blank onto the tap it is retracted to an extent, to permit of a successive blank to be positioned in advance thereof, to be subsequently acted on by the part 96 in the same manner as such part has acted on a preceding blank. When part 96 is performing its function on a blank, it sustains the other blanks in the chute 56 to arrest the gravity feed of the blanks until part 96 has been retracted to an extent to clear the lowermost blank in the chute 56. The forward end terminal portion of the element 96 is formed with a socket 102 to form a clearance for the outer end of the tap when passing through that blank pushed by element 96 onto the tap.

Detachably secured by the holdfast means 103 to one side of the platform 39 to one side and rearwardly of the guide structure 58 is an upstanding casing 104 in which is journaled horizontally thereof, the rear end terminal portion 105 of the shaft 52. Bearings 106 are arranged in casing 104 for shaft portion 105. The latter is provided with a worm 107. Detachably secured to the other side of the platform 39, by the holdfast means 108 is an upstanding bearing 109 which aligns in spaced relation with the casing 104. Journaled in and transversely of the upper portion of casing 104 is the operating shaft 110 for a double cam-like pusher device 111 which acts to intermittently apply a shifting action to the element 99 of the structure 58. The shaft 110 is journaled in the bearing 109 and carries a worm gear 112 which meshes with and is driven from the worm 107. The pusher device 111 is detachably connected to the shaft 110 to provide for reversing it when the spindle 42 operates in an anti-clockwise direction. The device 111 consists of a hub 113 formed with a pair of oppositely disposed pusher fingers or cams 114, 115 for acting on the element 99 for intermittently shifting it. The fingers 114, 115 are of like form. The pusher device 111 is shown as positioned when the spindle 42 is operating in a clockwise direction. When the device 111 is used, when the spindle is operating anti-clockwise it will be disposed in a position reversed with respect to the showing Figure 5. The device 111 is always to operate in the same direction as the spindle. The fingers 114, 115 are pointed, gradually increase in thickness from their outer to their inner ends, have their outer side edges rounded or cammed for riding against the outer terminus of the end portion 101 of element 59 and have their inner ends rounded. The fingers are disposed in offset relation and are in parallel planes. The rabbeted lower portion on the rear end of the element 99 provides for the latter to quickly spring back as a finger clears the outer terminus of the reduced terminal portion 101. Each finger is so formed as to provide for the shift of element 95 to an extent to perform its function. The fingers have an intermittent wiping action on element 99 to shift it to an extent to move the element 95 sufficiently for the latter to perform its function.

The platform 39 below the head 28 and holders 57 is formed with an opening 116 and below the latter, within the supporting structure 38 is arranged a removable pan or receptacle 117 for receiving the cuttings. The pan 117 is removable through an opening 118 formed in one side of structure 38. The opening 118 is normally closed by a hinged latchable door 119.

Before the machine is operated, the passage in the head 28 is supplied with blanks which are arranged on the shank of the tool and coact with the wall of the passage to center the tap.

The holders 57 are termed in the claims, a receiving means for the blanks which are to be operated upon.

What I claim is:

1. In a nut tapping machine, blank receiving means, upstanding means arranged over and for successively positioning blanks into the inner end of said receiving means, a rotatable tapping tool extended into said receiving means, a spring controlled intermittently operated reciprocating driven plunger for successively pushing the blanks positioned in said receiving means upon said tool to be acted upon by the latter, a spring controlled intermittently operated reciprocatory driving plunger for operating said driven plunger in a direction to push the blanks onto the tool, means for intermittently operating said driving plunger, a guide means for and in which is arranged said driven plunger, said driving plunger permanently extended into said driven plunger, the controlling spring for the driven plunger being arranged in said guide means, the controlling spring for the driving plunger being arranged in said driven plunger, and supporting means common to said guide means, blank receiving means and positioning means.

2. In a nut tapping machine, blank receiving means, upstanding means arranged over and for successively positioning blanks into the inner end of said receiving means, a rotatable tapping tool extended into said receiving means, a spring controlled intermittently operated reciprocating driven plunger for successively pushing the blanks positioned in said receiving means upon said tool to be acted upon by the latter, a spring controlled intermittently operated reciprocatory driving plunger for operating said driven plunger in a direction to push the blanks onto the tool, means for intermittently operating said driving plunger, a guide means for and in which is arranged said driven plunger, said driving plunger permanently extended into said driven plunger, the controlling spring for the driven plunger being arranged in said guide means, the controlling spring for the driving plunger being arranged in said driven plunger, supporting means common to said guide means, blank receiving means and positioning means, operating means for said tapping tool, and means driven from said operating means for driving the means for intermittently operating said driving plunger.

3. In a nut tapping machine, a pair of horizontally disposed inner sidewise aligned parallel adjustable coacting jaws for receiving and holding the blanks to be acted upon, said jaws being of like form, oppositely disposed, having the upper portions of their rear ends formed with cutouts for the passage of the blanks successively into the jaws and having their outer side surfaces formed lengthwise thereof with lateral extensions, horizontal spaced parallel oppositely disposed supporting arms between which said jaws are arranged, said arms having their inner side surfaces formed lengthwise thereof with grooves for slidably receiving said extensions, combined adjusting, supporting and limit screws carried by said arms for and engaging in said jaws, a rotatable tap means operating in and for successively acting on the blanks within the jaws, an intermittently operable spring controlled plunger structure for successively pushing the blanks received in said jaws onto said tap means, and means for intermittently operating the plunger structure.

4. In a nut tapping machine, a pair of horizontally disposed inner sidewise aligned parallel adjustable coacting jaws for receiving and holding the blanks to be acted upon, said jaws being of like form, oppositely disposed, having the upper portions of their rear ends formed with cutouts for the passage of the blanks successively into the jaws and having their outer side surfaces formed lengthwise thereof with lateral extensions, horizontal spaced parallel oppositely disposed supporting arms between which said jaws are arranged, said arms having their inner side surfaces formed lengthwise thereof with grooves for slidably receiving said extensions, combined adjusting, supporting and limit screws carried by said arms for and engaging in said jaws, a rotatable tap means operating in and for successively acting on the blanks within the jaws, an intermittently operable spring controlled plunger structure for successively pushing the blanks received in said jaws onto said tap means, means for intermittently operating the plunger structure, and supporting means common to said jaws, the said blank positioning means, the said arms and the said plunger structure.

5. In a nut tapping machine, a pair of horizontally disposed inner sidewise aligned parallel adjustable coacting jaws for receiving and holding the blanks to be acted upon, said jaws being of like form, oppositely disposed, having the upper portions of their rear ends formed with cutouts for the passage of the blanks successively into the jaws and having their outer side surfaces formed lengthwise thereof with lateral extensions, horizontal spaced parallel oppositely disposed supporting arms between which said jaws are arranged, said arms having their inner side surfaces formed lengthwise thereof with grooves for slidably receiving said extensions, combined adjusting, supporting and limit screws carried by said arms for and engaging in said jaws, a rotatable tap means operating in and for successively acting on the blanks within the jaws, an intermittently operable spring controlled plunger structure for successively pushing the blanks received in said jaws onto said tap means, means for intermittently operating the plunger structure, driving means for said tap means, and means operated from said driving means for operating the means intermittently operating said plunger structure.

6. In a nut tapping machine, a pair of horizontally disposed inner sidewise aligned parallel adjustable coacting jaws for receiving and holding the blanks to be acted upon, said jaws being of like form, oppositely disposed, having the upper portions of their rear ends formed with cutouts for the passage of the blanks successively into the jaws and having their outer side surfaces formed lengthwise thereof with lateral extensions, horizontal spaced parallel oppositely disposed supporting arms between which said jaws are arranged, said arm having their inner side surfaces formed lengthwise thereof with grooves for slidably receiving said extensions, combined adjusting, supporting and limit screws carried by said arms for and engaging in said jaws, a rotatable tap means operating in and for successively acting on the blanks within the jaws, an intermittently operable spring controlled plunger structure for successively pushing the blanks received in said jaws onto said tap means, means for intermittently operating the plunger structure, supporting means common to said jaws, the said blank positioning means, the said arms and the said plunger structure, driving means for said tap means, and means operated from said driving means for operating the means intermittently operating said plunger structure.

7. In a nut tapping machine, a pair of horizontally disposed inner sidewise aligned parallel adjustable coacting jaws for receiving and holding the blanks to be acted upon, said jaws being of like form, oppositely disposed, having the upper portions of their rear ends formed with cutouts for the passage of the blanks successively into the jaws and having their outer side surfaces formed lengthwise thereof with lateral extensions, horizontal spaced parallel oppositely disposed supporting arms between which said jaws are arranged, said arms having their inner side surfaces formed lengthwise thereof with grooves for slidably receiving said extensions, combined adjusting, supporting and limit screws carried by said arms for and engaging in said jaws, a rotatable tap means operating in and for successively acting on the blanks within the jaws, an intermittently operable spring controlled plunger structure for successively pushing the blanks received in said jaws onto said tap means, means for intermittently operating the plunger structure, driving means for selectively operating said tap means clockwise and anti-clockwise, and means operated from said driving means for operating the means intermittently operating the plunger structure, the said means intermittently operating the plunger structure being reversible.

8. In a nut tapping machine, a pair of horizontally disposed inner sidewise aligned parallel coacting jaws for receiving and holding the blanks to be acted upon, said jaws being of like form, oppositely disposed and having the upper portions of their rear ends formed with cutouts for the passage of the blanks successively into the jaws, a rotatable tap means operating in and for successively acting on the blanks within the jaws, an intermittently operable spring controlled plunger structure for successively pushing the blanks received in said jaws onto said tap means, means for intermittently operating the plunger structure, said jaws being disposed in adjustable relation, and said means for intermittently operating the plunger structure being reversible.

9. In a nut tapping machine, a pair of horizontally disposed inner sidewise aligned parallel coacting jaws for receiving and holding the blanks to be acted upon, said jaws being of like form, oppositely disposed and having the upper portions of their rear ends formed with cutouts for the passage of the blanks successively into the jaws, a rotatable tap means operating in and for successively acting on the blanks within the jaws, an intermittently operable spring controlled plunger structure for successively pushing the blanks received in said jaws onto said tap means, means for intermittently operating the plunger structure, supporting means common to and into which extend said jaws, the blank positioning means and the plunger structure, said jaws being disposed in horizontal adjustable relation, said means for intermittently operating the plunger structure being reversible, and said supporting means being formed with clearances for the adjusting of said jaws outwardly.

10. In a nut tapping machine, a pair of horizontally disposed inner sidewise aligned parallel coacting jaws for receiving and holding the blanks to be acted upon, said jaws being of like form, oppositely disposed and having the upper portions of their rear ends formed with cutouts for the passage of the blanks successively into the jaws, a rotatable tap means operating in and for successively acting on the blanks within the jaws, an intermittently operable spring controlled plunger structure for successively pushing the blanks received in said jaws onto said tap means, means for intermittently operating said plunger structure from the rear end of the latter, driving means for said tap means, means operated from the driving means for the tap structure for operating the means intermittently operating the plunger structure, said jaws being disposed in adjustable relation, and said means for intermittently operating the plunger structure being reversible.

11. In a nut tapping machine, a rotatable tapping tool of the cranked type having its end terminal portions co-axial, a driving head having a passage for and of a contour to connect said tool therewith for rotating the latter, one of said end terminal portions extended from one end of said passage and being threaded for tapping, means for successively supplying blanks to be tapped to align with the end surface of said threaded portion, a blank pushing mechanism bodily travelling co-axially with the said portions and including respectively an intermittently operable reciprocatory primary plunger for successively pushing the supplied blanks onto said threaded portion to be tapped whereby said threaded terminal portion, in connection with the remaining part of the tool will direct the completed work through said passage to cause it to coact with the wall of the latter to center said threaded terminal portion with respect to the work to be acted upon, a combined cushioning and controlling spring for said plunger, and intermittently operable cam actuated spring controlled auxiliary plunger for intermittently imparting blank pushing strokes to the primary plunger against the action of the controlling spring for the latter, and said combined cushioning and controlling spring for the primary plunger providing for the latter, after pushing a blank on the tool to be moved in a direction to permit of a follower blank being arranged in a position to be pushed onto the tool.

12. In a nut tapping machine, a blank pushing mechanism including an intermittently operable reciprocatory primary plunger adapted for successively pushing blanks onto a tapping tool to be tapped, a combined cushioning and controlling spring for said plunger, an intermittently operable spring controlled reciprocatory auxiliary plunger so correlated with the primary plunger for intermittently imparting blank pushing strokes to the latter, said combined cushioning and controlling spring providing for the primary plunger, after it pushes a blank on the tool to be moved in a direction to permit of a blank being arranged in a position to be pushed onto the tool, and means coacting with said primary plunger for confining the said combined cushioning and controlling spring about the primary plunger intermediate the ends of the latter.

13. In a nut tapping machine, a tapping tool, means for successively receiving blanks to be acted upon by the tool, a spring controlled intermittently operated reciprocatory plunger for successively pushing the blanks onto the tool to be tapped, and a spring controlled cam actuated intermittently operated plunger for intermittently operating the blank pusher plunger, said pusher plunger formed of a hollow part closed at its inner end and a solid part extending from each end of reduced diameter relative to the hollow part, said pusher plunger having its controlling spring encompassing and confined on said solid part, and said cam actuated plunger being arranged within and extended from the other end of said hollow part, the controlling spring for the cam actuated plunger being arranged within said hollow part between the inner end of the latter and the inner end of such plunger.

14. In a nut tapping machine, a rotatable tapping tool of the cranked type having its end terminal portions coaxial, one of said portions being threaded for tapping, means for successively supplying blanks to be tapped, an intermittently operable spring controlled reciprocatory primary plunger travelling coaxially with said portions for successively pushing blanks onto said threaded portion to be tapped, and an intermittently operable cam actuated reciprocatory spring controlled auxiliary plunger travelling coaxially with said portions and in unison with the primary plunger and so correlated to the latter for intermittently imparting blank pushing strokes to said primary plunger against the action of the controlling spring for the latter.

HARVEY E. PRUITT.